US012794277B2

(12) United States Patent
Agafonov et al.

(10) Patent No.: US 12,794,277 B2
(45) Date of Patent: Nov. 10, 2026

(54) WIRELESS POWER TRANSFER

(71) Applicant: KONINKLIJKE PHILIPS N.V., Eindhoven (NL)

(72) Inventors: Aleksei Agafonov, Eindhoven (NL); Johannes Wilhelmus Draak, Horst (NL); Pascal Leonard Maria Theodoor Lebens, Eindhoven (NL)

(73) Assignee: Koninklijke Phiips N.V., Eindhoven (NL)

( * ) Notice: Subject to any disclaimer, the term of this patent is extended or adjusted under 35 U.S.C. 154(b) by 0 days.

(21) Appl. No.: 19/132,439

(22) PCT Filed: Nov. 21, 2023

(86) PCT No.: PCT/EP2023/082619
§ 371 (c)(1),
(2) Date: May 23, 2025

(87) PCT Pub. No.: WO2024/110501
PCT Pub. Date: May 30, 2024

(65) Prior Publication Data

US 2026/0196882 A1 Jul. 9, 2026

(30) Foreign Application Priority Data

Nov. 25, 2022 (EP) .................................... 22209587

(51) Int. Cl.
*H02J 50/27* (2016.01)
*H02J 50/12* (2016.01)
(Continued)

(52) U.S. Cl.
CPC .............. *H02J 50/80* (2016.02); *H02J 50/12* (2016.02); *H04B 5/79* (2024.01); *H02J 50/001* (2020.01)

(58) Field of Classification Search
CPC .. H02J 5/005; H02J 7/025; H02J 17/00; H02J 50/12; H02J 50/10
See application file for complete search history.

(56) References Cited

U.S. PATENT DOCUMENTS

| | | | | |
|---|---|---|---|---|
| 11,764,617 B2 * | 9/2023 | Melone | .................... | H02J 50/10<br>307/104 |
| 12,095,281 B2 * | 9/2024 | Sekizawa | ................ | H02J 50/12 |

(Continued)

FOREIGN PATENT DOCUMENTS

| | | |
|---|---|---|
| CN | 103370885 A | 10/2013 |
| EP | 4084281 A1 | 11/2022 |

OTHER PUBLICATIONS

International Search Report and Written Opinion from PCT/EP2023/082619 dated Jan. 25, 2024.
QI Specification downloaded Apr. 22, 2025.

*Primary Examiner* — Menatoallah Youssef
*Assistant Examiner* — Esayas G Yeshaw

(57) ABSTRACT

A power transmitter (101) wirelessly provides power to a power receiver (105) via a power transfer signal generated by a power transfer coil (103). A communication driver (209) generates a communication drive signal for a communication coil (207) to generate a communication carrier signal. During a standby phase in which no power transfer signal is transmitted, the power transmitter generates a pulsed communication carrier signal. The power receiver (105) transmits identity messages during the standby phase when the communication carrier signal is present. The identity messages includes a device identity for the power receiver (105). The power receiver (105) may request a power transfer operation by changing the device identity of the identity messages and in response to detecting a different (Continued)

device identity, a phase controller (203) of the power transmitter initializes a transition from the standby phase to the power transfer phase.

28 Claims, 5 Drawing Sheets

(51) Int. Cl.

| | |
|---|---|
| ***H02J 50/80*** | (2016.01) |
| ***H04B 5/79*** | (2024.01) |
| *H02J 50/00* | (2016.01) |

(56) References Cited

U.S. PATENT DOCUMENTS

| | | | | |
|---|---|---|---|---|
| 2019/0097459 | A1* | 3/2019 | Ettes | H02J 50/12 |
| 2020/0099417 | A1 | 3/2020 | Park et al. | |
| 2021/0194296 | A1* | 6/2021 | Jo | H02J 50/12 |
| 2022/0045553 | A1 | 2/2022 | Shichino | |
| 2022/0247239 | A1 | 8/2022 | Chung et al. | |
| 2023/0047559 | A1* | 2/2023 | Kim | H01F 27/34 |
| 2025/0007331 | A1* | 1/2025 | Ganesh | H02J 50/80 |
| 2025/0309693 | A1* | 10/2025 | Takahashi | H02J 50/12 |
| 2026/0039019 | A1* | 2/2026 | Dai | H01Q 7/00 |

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2023/082619, filed on Nov. 21, 2023, which claims the benefit of EP Patent Application No. EP 22209587.9, filed on Nov. 25, 2022. These applications are hereby incorporated by reference herein.

FIELD OF THE INVENTION

The invention relates to operation of a wireless power transfer system arranged to wirelessly transfer power from a power transmitter to a power receiver, and in particular, but not exclusively, to wirelessly transfer power to a high power device, such as a kitchen appliance.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply where power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.5 KW.

In many systems, such as specifically Qi systems, communication from the power receiver to the power transmitter may use load modulation where a load of the power transfer signal is varied in dependence on the data to be transmitted. However, such load modulation may be difficult to detect if the power transfer loading of the power transfer signal varies at the same time. Similarly, communication from the power transmitter to the power receiver may be achieved by modulating the power transfer signal (e.g. amplitude or frequency modulation) but interference to such modulation may be caused by variations in the parameters of the power transfer signal due to e.g. a varying load.

In some systems it has accordingly been proposed to use a completely separate communication approach. Specifically, Ki wireless power transfer systems may establish a two way communication link using the Near Field Communication, NFC, standard. The communication is during the power transfer phase performed in short time intervals in order to avoid or reduce interference between the power transfer and the communication. The power receiver is arranged to detect the NFC carrier to perform the communication during the short time intervals.

A challenge in implementing a wireless power transfer system providing a highly user friendly, safe, and efficient operation and user experience is that of how to control the initialization and terminations of power transfer operations. Conventionally, power transfer is started when it is detected that a power receiving device is positioned sufficiently close to a power transmitter, and specifically the power transmitter coil. The presence of the power receiver is detected by the power transmitter which in response initiates the transmission of power to the power receiver. The power receiver will then proceed to extract power and the power transfer will proceed.

Typically, this will be continued until the power receiver is removed from the power transmitter. Again, this removal of the power receiver may be detected, and the power transmitter may accordingly terminate the power transfer and switch off the power transfer signal.

In some cases, the power receiver may simply switch off without being removed from the power transmitter and indeed the power transfer operation may be terminated with the power receiver still being present. For example, a cordless kettle may be placed on top of a power transmitter and after having completed an operation of boiling water, the kettle may switch off while still remaining on top of the power transmitter.

However, a particular challenge in this case is how to re-initiate a power transfer if subsequently desired. For example, if it is desired to re-boil the water in the kettle, a mechanism is needed to initialize a new power transfer operation. This is a particularly difficult challenge as the devices are essentially in a state of no power being supplied to the power receiver.

One current approach is based on requiring the user to actively provide a user input to the power transmitter causing this to start-up and initialize a new power transfer operation. However, this is not ideal in many situations. For example, it may seem highly unintuitive to the user that he needs to engage with the user interface of the power transmitter rather than e.g. the user appliance. It also hinders the user interface to be optimized and adapted to the individual power receiving device/appliance. It may also result in the physical position of the activation being suboptimal (e.g. positioned on a worktop rather than on the appliance) etc.

Another option that has been proposed, in particular for Ki, is that the user is required to first remove the power receiving device and then reposition it on the power transmitter. However, this is a highly impractical and counter-intuitive operation. It also requires frequent checking of the presence of the power receiver device.

Current approaches tend to be suboptimal and require relatively complex functionality and/or undesirable user operation.

Hence, an improved operation for a wireless power transfer system would be advantageous, in particular, an approach allowing increased flexibility, reduced cost, reduced complexity, improved user experience, additional functionality, facilitated operation, facilitated user control and/or improved performance would be advantageous. For example, an improved approach for initializing power transfer for an already present power receiver without requiring a power transmitter user interface and providing improved user experience would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal, the power transmitter comprising: a power transfer coil arranged to generate the power transfer signal; a power transfer driver arranged to generate a power transfer drive signal for the power transfer coil, the power transfer driver being arranged to generate the power transfer drive signal during a power transfer phase; a communication coil arranged to generate a communication carrier signal; a communication driver arranged to generate a communication drive signal for the communication coil to generate the communication carrier signal, the communication driver being arranged to generate the communication drive signal to employ repeating time frames during a standby phase in which no power transfer signal is present, each repeating time frame comprising a communication time interval and a non-communication time interval, a duration of the communication time interval not exceeding 20% of a duration of the non-communication time interval and a power level of the communication drive signal during the non-communication time intervals not exceeding 10% of a power level of the communication drive signal during the communication time intervals; a communication unit arranged to receive identity messages load modulated onto the communication carrier signal during communication time intervals during the standby phase, each identity message of the identity messages comprising a device identity for the power receiver; a phase controller arranged to switch the power transmitter from the power transfer phase to the standby phase in response to a power transfer termination; and wherein the phase controller is arranged to compare a first device identity being a device identity of a first identity message to a second device identity being a device identity of a second identity message received from the power receiver prior to the first identity message, and to remain in the standby phase if the first device identity matches the second device identity and to initialize a transition from the standby phase to the power transfer phase in response to a detection that the first device identity does not match the second device identity.

The invention may allow improved performance in many embodiments. It may allow an overall improved power transfer operation in many systems and embodiments.

The approach may allow an efficient and often ultra-low power standby phase yet still allow reliable and user friendly power initialization. The approach may in particular be suitable for scenarios in which a power receiver may remain positioned close to the power transmitter after the termination of a power transfer operation. The approach may provide an efficient and practical approach with low complexity allowing a user interaction with a user interface of the power receiver to initialize a new power transfer operation.

The approach may further provide an efficient way of allowing minimum functions to be performed to e.g. allow a new power transfer operation to be started by providing an auxiliary power transfer using the communication carrier signal that is also used to support the communication during the standby phase.

The approach in many embodiments further provides reliable operation and allows additional flexibility and functionality by providing an approach of ensuring that a new power transfer operation is for a specific power receiver, and specifically in many scenarios that it is with a power receiver that has previously been involved in a power transfer operation.

The approach may during a standby phase provide an improved secondary/auxiliary power transfer path that utilizes a communication path thereby providing a synergistic interoperability between communication and auxiliary power provision.

The power transfer driver may be arranged to generate the communication drive signal and thus the communication carrier signal, to have a non-zero (often constant/fixed) amplitude during the communication time intervals and to have a zero amplitude during non-communication time intervals.

In many embodiments, a duration of the communication time interval is no more than 5%, 10%, or 20% of the duration of the repeating time frame. In many embodiments, the duration of the non-communication time intervals is no less than 70%, 80%, or 90% of the duration of the repeating time frame.

The detection of the first identity message comprising a changed device identity may be a detection that the first identity message comprises a different device identity than a device identity of a previous (typically the previous) received identification message.

In accordance with an optional feature of the invention, the second identity message is received in the same standby phase as the first identity message.

This may allow improved operation and/or facilitate implementation and/or operation in many embodiments.

The approach may allow a particularly advantageous operation and may typically allow a highly efficient, reliable, and practical detection of a request for a power transfer.

In accordance with an optional feature of the invention, the second device identity is a device identity for a power receiver receiving power in a power transfer phase immediately preceding the standby phase.

This may allow improved operation and/or facilitate implementation and/or operation in many embodiments.

The approach may allow a particularly advantageous operation and may typically allow a highly efficient, reliable, and practical detection of a request for a power transfer.

In accordance with an optional feature of the invention, the second identity message is received from the power receiver prior to entering the standby phase.

This may allow improved operation and/or facilitate implementation and/or operation in many embodiments.

The approach may allow a particularly advantageous operation and may typically allow a highly efficient, reliable, and practical detection of a request for a power transfer.

In some embodiments, the second identity message is received prior to the standby phase in which the first identity message is received.

In accordance with an optional feature of the invention, the phase controller is arranged to store a configuration parameter for the power receiver upon entering the standby phase; to retrieve the configuration parameter as part of the transition from the standby phase to the power transfer phase, and to determine an operating parameter for the power transfer phase in dependence on the configuration parameter.

This may allow particularly advantageous operation and/or implementation in many embodiments.

In accordance with an optional feature of the invention, the communication carrier signal is a Near Field Communication, NFC, carrier.

The approach may allow a particularly advantageous operation and may typically allow a highly efficient, reliable, and practical detection of a request for a power transfer. It may further provide improved backwards compatibility and suitability for a number of systems, specifications, and approaches.

In accordance with an optional feature of the invention, the identity messages are Near Field Communication, NFC, NFC Data Exchange Format, NDEF, configuration messages.

The approach may allow a particularly advantageous operation in many embodiments.

In accordance with an optional feature of the invention, the repeating time frames have duration of no less than 50 msec and no more than 10 seconds.

This may allow particularly advantageous operation and/or implementation in many embodiments.

In many embodiments, the repeating time frames may have a duration of no less than 50, 100, 250, 500, 1000 msec. In many embodiments, the repeating time frames may have a duration of no more than 1, 2,5, 10 seconds.

In accordance with an optional feature of the invention, the power transmitter controller 203 is arranged to adapt an operation of a power transfer phase initialization process in response to the detection of the changed identity.

This may allow improved operation and/or facilitate implementation and/or operation in many embodiments.

According to an aspect of the invention there is provided a power receiver for wirelessly receiving power from a power transmitter via an electromagnetic power transfer signal, the power receiver comprising: an inductive power extraction element arranged to extract power from the power transfer signal during a power transfer phase; a communication coil for receiving a communication carrier signal; the communication drive signal employing repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals; a communication unit arranged to transmit identity messages by load modulation of the communication carrier signal during communication time intervals during the standby phase, each identity message of the identity messages comprising a device identity for the power receiver; a power extractor coupled to the communication coil and arranged to extract a power supply signal from the communication coil and to supply a circuit of the communication unit by the power supply signal during the communication time intervals; and a controller arranged to change a device identity for a first identity message relative to a device identity of a previous identity message in response to a detection of a power request, the power request being an indication of a request for initiation of a power transfer phase.

The invention may allow improved performance in many embodiments. It may allow an overall improved power transfer operation in many systems and embodiments.

The approach may allow an efficient and often ultra-low power standby phase yet still allow reliable and user friendly power initialization. The approach may in particular be suitable for scenarios in which a power receiver may remain positioned close to the power transmitter after the termination of a power transfer operation. The approach may provide an efficient and practical approach with low complexity allowing a user interaction with a user interface of the power receiver to initialize a new power transfer operation.

The approach may allow the power receiver to control when a new power transfer is initiated while simultaneously supporting ultra-low power operation during a standby phase.

The change of the device identity may comprise including a device identity in the first identity message that is different from any device identity previously transmitted by the power receiver during the standby phase.

In accordance with an optional feature of the invention, the power receiver further comprises a user interface, and the controller is arranged to detect the power request in response to a detection of a user activation of the user interface.

This may allow improved operation and/or facilitate implementation and/or operation in many embodiments. The approach may in particular allow a reduced complexity and facilitated implementation. The approach may allow for a user interface of the power receiver to be accessed by a user in order to initialize a new power transfer without e.g. requiring movement of the power receiver and while allowing the standby phase to operate in an ultra-low power mode.

In accordance with an optional feature of the invention, the user interface is a passive user interface arranged to maintain a user activation indication of the user activation for a duration in excess of a duration of the non-communication time interval.

This may allow particularly advantageous operation and/or implementation in many embodiments. The approach may allow a very low power consumption during the power transfer phase while still allowing a power receiver based user interface to control power transfer initialization.

In accordance with an optional feature of the invention, the controller is arranged to store a first user interface setting of a power transfer phase prior to entering a standby phase, to determine a second user interface setting during the standby phase, and to detect the user activation in response to a detection of a difference between the first user interface setting and the second user interface setting.

This may allow particularly advantageous operation and/or implementation in many embodiments.

In accordance with an optional feature of the invention, the controller is arranged to be powered by the supply signal only during the communication time intervals.

This may allow particularly advantageous operation and/or implementation in many embodiments. It may in particular allow an ultra-low power standby phase.

According to an aspect of the invention there is provided a wireless power transfer system comprising a power transmitter and a power receiver as described above.

According to an aspect of the invention there is provided a method of operation for a power transmitter wirelessly providing power to a power receiver via an inductive power transfer signal, the power transmitter comprising: a power transfer coil arranged to generate the power transfer signal; and a communication coil arranged to generate a communication carrier signal; and the method further comprising: generating a power transfer drive signal for the power transfer coil during a power transfer phase; generating a communication drive signal for the communication coil to generate the communication carrier signal, the communication drive signal being generated to employ repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals; receiving identity messages load modulated onto the communication carrier signal during communication time intervals during the standby phase, each identity message of the identity messages comprising a device identity for the power receiver; switching the power transmitter from the power transfer phase to the standby phase in response to a power transfer termination; and comparing a first device identy being a device identity of a first identity message to a second device identity being a device identity of a second identity message received from the power receiver prior to the first identity message, and remaining in the standby phase if the first device identity matches the second device identity and initializing a transition from the standby phase to the power transfer phase in response to a detection that the first device identity does not match the second device identity.

According to an aspect of the invention there is provided a method of operation for a power receiver wirelessly receiving power from a power transmitter via an electromagnetic power transfer signal, the power receiver comprising: an inductive power extraction element arranged to extract power from the power transfer signal during a power transfer phase; and the method comprising: a communication coil receiving a communication carrier signal; the communication drive signal employing repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals; transmitting identity messages by load modulation of the communication carrier signal during communication time intervals during the standby phase, each identity message of the identity messages comprising a device identity for the power receiver; extracting a power supply signal from the communication coil; supplying a circuit of the communication unit by the power supply signal during the communication time intervals; and changing a device identity for a first identity message relative to a device identity of a previous identity message in response to a detection of a power request, the power request being an indication of a request for initiation of a power transfer phase.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Ki specification. However, it will be appreciated that the invention is not limited to this application but may be applied to many other wireless power transfer systems.

Figure 1:
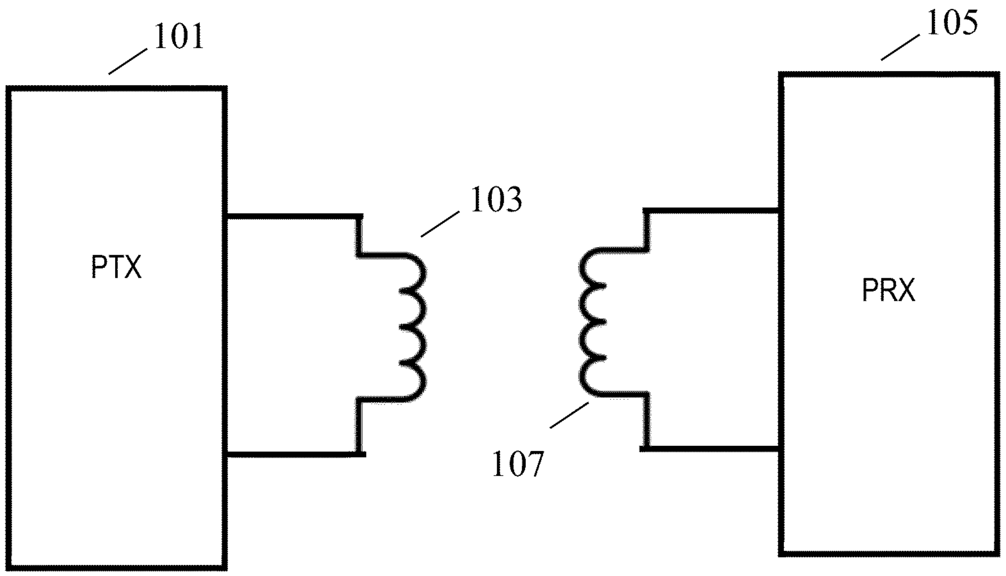
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element. The power receiver may accordingly provide a load to the power transfer signal by comprising an inductive power extraction element which specifically may be a power extraction coil or an electrical (e.g. heating) element in which current is induced by the power transfer signal.

The system is arranged to transfer substantial power levels, and specifically the power transmitter may support power levels in excess of 50 W, 100 W, 500 W, or 1 kW. For example, for Ki type applications, the power transfers may often be in excess of 100 W, and may be up to more than 2500 W for very high power applications.

In the following, the operation of the power transmitter 101 and the power receiver 105 will be described with specific reference to an embodiment generally in accordance with the Specifications (except for the herein described (or consequential) modifications and enhancements) being developed by the Wireless Power Consortium. In particular, the power transmitter 101 and the power receiver 105 may follow, or substantially be compatible with, elements of the Ki Standards.

Many wireless power transfer systems, and in particular high power systems such as Ki, utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Figure 2:
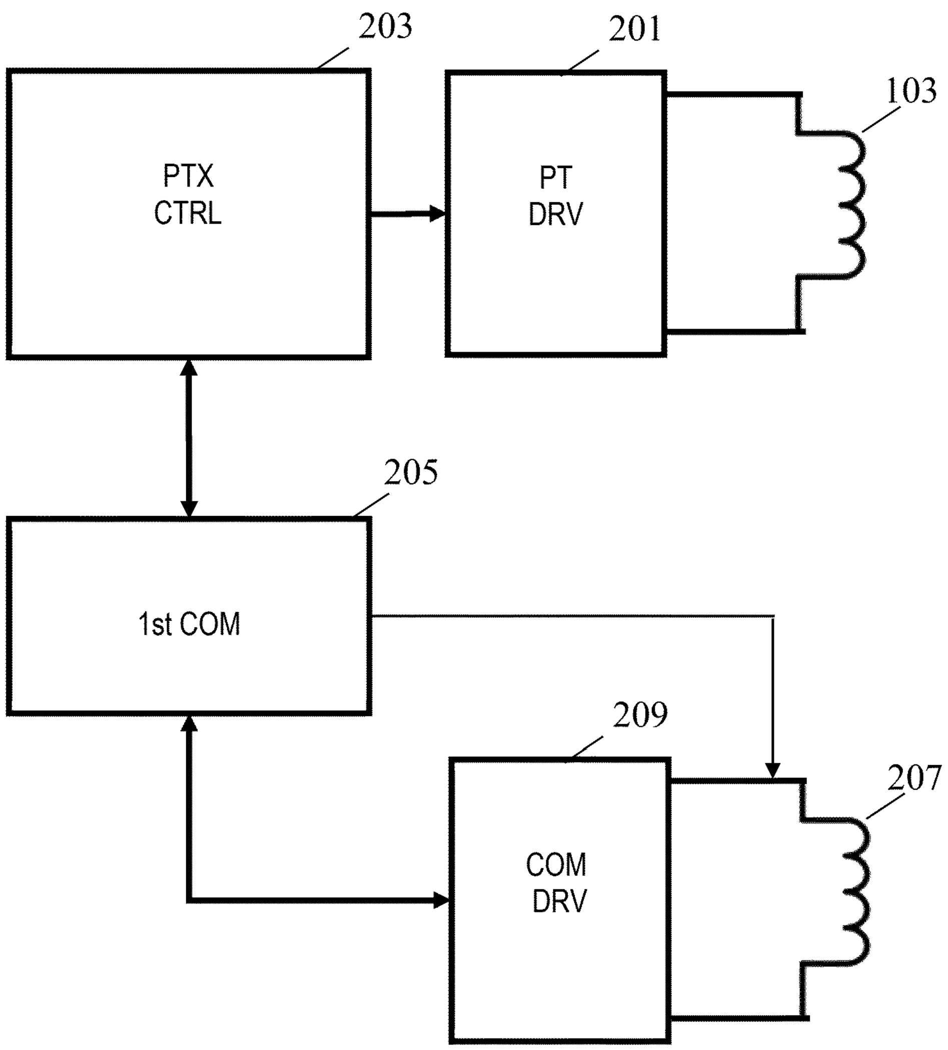
FIG. 2 illustrates an example of elements of a power transmitter in accordance with some embodiments of the invention.
Figure 3:
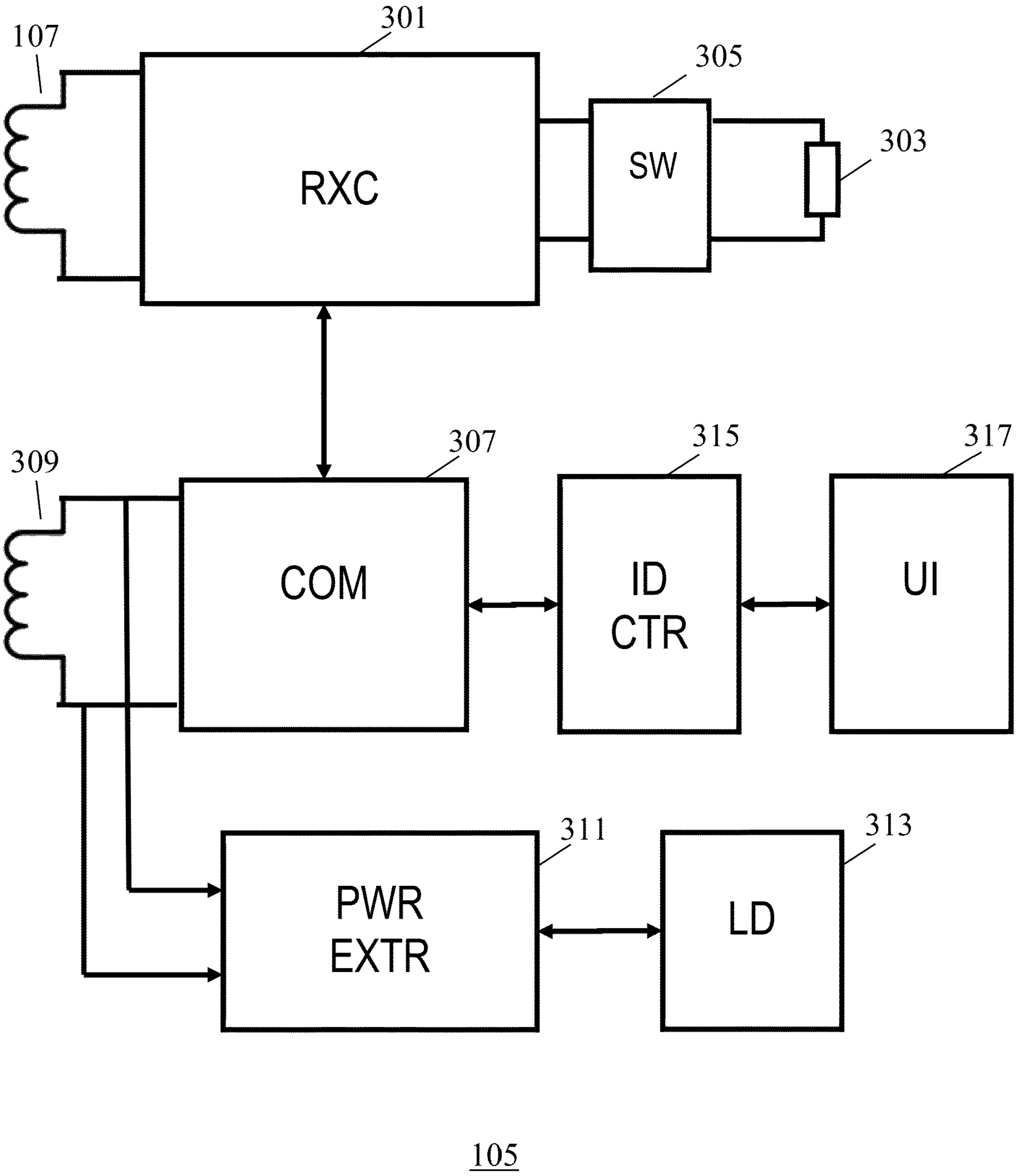
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates the electromagnetic power transfer signal, which provides a power transfer to the power receiver 105. The power transfer signal is provided (at least) during power transfer time intervals of the power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi or Ki Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a first communicator 205 which is arranged to receive data and messages from the power receiver 105 as well as transmit data and messages to the power receiver 105 (as will be appreciated by the skilled person, a data message may provide one or more bits of information).

In the approach, the communication is performed by modulation of a communication carrier signal that is generated by a first communication coil 207. The power transmitter specifically comprises a communication driver 209 which is coupled to the first communication coil 207. The communication driver 209 is arranged to generate a communication drive signal which is fed to the first communication coil 207 to generate the communication carrier signal. The communication driver 209 may typically be arranged to generate the communication drive signal/communication carrier signal to have a substantially different frequency than the power transfer drive signal/power transfer signal. In many embodiments, the frequency of the communication carrier signal may be no less than 10, 100, or 500 times higher than the frequency of the power transfer signal. In many embodiments, the frequency of the communication drive signal/communication carrier signal may have a frequency of no less than 500 kHz, 1 MHz, or 10 MHz. Specifically for an NFC implementation, the communication carrier signal frequency may be 13.56 MHz.

The first communicator 205 is coupled to the communication driver 209 and is arranged to control this to modulate the communication drive signal/communication carrier signal in order to transmit data to the power receiver (in the following references to the communication drive signal also include the implicit reference to the communication carrier signal as appropriate).

The modulation is in the specific example an amplitude modulation of the communication drive signal, and specifically a binary communication using Amplitude Shift Keying (ASK) is used. However, it will be appreciated that in other embodiments, the modulation may use other approaches, such as phase or frequency modulation of the communication drive signal.

In some embodiments, the first communicator 205 may for example receive data to be transmitted to the power receiver from the power transmitter controller 203 and in response generate a control modulation signal that is fed to the communication driver 209. The control modulation signal may for example be a binary signal that matches the data to be transmitted and the communication driver 209 may be arranged to generate the communication drive signal to have corresponding amplitude variations.

For communication from the power receiver to the power transmitter, the modulation of the communication drive signal may be a load modulation. The power receiver may be arranged to modulate the communication carrier signal by varying a loading of the communication carrier signal generated by the first communication coil 207 in accordance with the data to be transmitted. The first communicator 205 may be arranged to sense variations in the voltage and/or current of the first communication coil 207 and to demodulate the load modulation based on these. The skilled person will be aware of the principles of load modulation and therefore these will not be described in further detail.

In many embodiments, the communication may be in accordance with the Near Field Communication, NFC, Specifications and the power receiver may specifically include NFC functionality. In many embodiments, the first communicator 205, communication driver 209, and first communication coil 207 may implement (at least) the functionality of an NFC reader. Thus, in many embodiments, the communication drive signal/communication carrier signal is a constant level (except for modulation) 13.56 MHz signal.

The following description will focus on examples where the communication between the power transmitter and power receiver is by NFC communication and specifically where modulation of the NFC carrier in the direction from the power transmitter to the power receiver is by Amplitude Shift Keying (ASK) and modulation of the NFC carrier in the direction from the power receiver to the power transmitter is by load modulation.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Qi or Ki Specifications.

In order to support communication from the power receiver 105 to the power transmitter 101 the power receiver 105 comprises a second communicator 307 and a second communication coil 309. The second communication coil 309 is arranged to couple to the first communication coil 207 and thus the communication carrier signal induces a current (at least an emf) in the second communication coil 309.

The second communicator 307 is coupled to the second communication coil 309 and is arranged to determine amplitude variations in the induced signal and to demodulate amplitude modulations of the communication carrier signal. Thus, the second communicator 307 is arranged to decode data transmitted from the power transmitter by amplitude modulation of the communication carrier signal. It will be appreciated that in other embodiments, the second communicator 307 may be arranged to decode data modulated onto the communication carrier signal using other modulation formats such as frequency or phase modulation.

The second communicator 307 is further arranged to load modulate the communication carrier signal in order to transmit data from the power receiver to the power transmitter. Specifically, the second communicator 307 may comprise a load (such as a capacitor) which depending on the data to transmit can be switched between being coupled to the second communication coil 309 and not being coupled to the second communication coil 309. These load modulations may then be detected by the first communicator 205 of the power transmitter.

In the specific example, the second communication coil 309 and the second communicator 307 may provide NFC compatible communication operation. Specifically, the second communication coil 309 may be arranged to provide functionality corresponding to an NFC tag and to decode data that has been ASK modulated onto the communication carrier signal in accordance with the NFC specifications.

Thus, the second communicator 307 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

In the example, the second communicator 307 is furthermore arranged to demodulate amplitude, frequency, and/or phase modulation of the communication carrier signal in order to retrieve data transmitted from the power transmitter.

In many embodiments, the wireless power transfer system, and thus the power transmitter and/or power receiver, may be arranged to operate in different phases and in particular it may operate in a power transfer phase in which the power transfer signal is generated, and thus in which the power transfer operation providing power to the load 303 is performed. In addition, the power transmitter may be arranged to operate in a standby phase in which power transfer signal is not generated by the power transmitter, and thus where no power transfer signal is present. In the standby phase, the power transfer driver 201 does not generate a power transfer drive signal and thus no drive signal is provided to the transmitter coil 103. In the standby phase, no power transfer signal is generated by the transmitter coil 103.

In many embodiments, such as e.g. many Ki based embodiments, the wireless power transfer system, and thus the power transmitter and/or power receiver, may be arranged to operate in different phases during the standby phase, i.e. the standby phase may itself be divided into different (sub) phases. These phases/modes may include the following:

A first phase is an idle phase. In this phase no power receiver is detected to be present by the power transmitter. During the idle phase, no power transfer signal is generated and no communication carrier signal is generated. In the idle phase, the power transmitter monitors for the presence of a power receiver. In particular, the power transmitter may at regular intervals generate an electromagnetic detection signal and if a load of this signal is detected, the power transmitter may consider that a power receiver is potentially present. When a power receiver is detected, the power transmitter may transition to a configuration phase. The idle phase may in some systems in itself be referred to by the term standby phase, for example in the Ki specifications a phase corresponding to the described idle phase is referred to as a standby phase.

In the configuration phase, configuration information/data may be exchanged between the power transmitter and the power receiver. The configuration information/data may provide information of properties of the power receiver and power transmitter to the complementary device. Each device may adapt an operational parameter based on the exchanged configuration data. Thus, the configuration phase may be used by the power transmitter and the power receiver to exchange specific information on the characteristics of the specific devices thereby allowing them to adapt the operation to the specific pairing of power transmitter and power receiver.

If the configuration phase is not successful, such as e.g. if the power transmitter does not receive suitable messages from the power receiver or an explicit termination is received, the power transmitter may return to the idle phase.

If the configuration and communication conclude successfully, the power transmitter proceeds to a connected phase. In the connected phase, the power transmitter and power receiver have established a communication and the devices may be adapted to each other. However, power transfer has not been initialized. During the connected phase, the communication carrier signal is generated, and it may specifically be continuously present during the connected phase. However, during the connected phase, no power transfer signal is generated. Further, during the connected phase, foreign object detection may be performed. Further, communication may be performed between the power transmitter and the power receiver. The power receiver may in many cases be arranged to extract power from the communication carrier signal (e.g. to power the internal functionality of the power receiver) during the connected phase.

The connected phase may in many scenarios be continued for a substantial time, including for hours or longer. For example, if a kitchen device, e.g. a blender, comprising a wireless power receiver as described is positioned on a worktop comprising a power transmitter as described, they may go through the configuration phase and thus enter the connected phase in an adapted and connected mode. The devices may then remain in this condition for a long time corresponding to the device, e.g. the blender, remaining on the worktop ready for being activated but not actually being switched on.

In response to a detection of a suitable event, the power transmitter and power receiver may transition from the connected phase to the power transfer phase. The event may typically be detected by the power receiver which may transmit a message to the power transmitter to request that the power transfer phase is entered. For example, if the user performs a suitable user action, such as pressing an on button, the power receiver may in response proceed to transmit a request to the power transmitter to request that the power transfer phase is entered.

The power transmitter (and the power receiver) may then proceed to transition to the power transfer.

In the power transfer phase, the power transmitter generates a power transfer drive signal and accordingly a power transfer signal. In the power transfer phase, power is provided/transferred to the power receiver by the power transfer signal. As described previously, the power transfer signal may use a time frame where the power transfer signal is provided in power transfer time intervals and with the time frame also comprising communication time intervals and/or foreign object detection time intervals. During the power transfer phase, the communication carrier signal may also be generated when communication is performed during the communication time intervals.

Upon termination of the power transfer, the power transmitter and the power receiver may return to the standby phase, and thus specifically it may return to a phase in which no power transfer signal is generated.

The configuration and the connected phases may together be referred to as initialization phases.

In the power transmitter of FIG. 2, the power transmitter controller 203 is arranged to control the power transmitter to operate in and transition between different phases. Further, as will be described in more detail later, the power transmitter and power receiver are arranged to operate in a standby phase which supports the continued presence of the power receiver while allowing the power transmitter to power down an operate in an extreme low power configuration. The described standby phase may specifically correspond to a modified standby phase, and in particular to a modified idle or connected phase, as described above.

The communication carrier signal may in addition to the communication also be used to enable an auxiliary power provision from the power transmitter to the power receiver. The auxiliary power transfer/path may provide a low level power supply that may e.g. be used to supply internal circuitry such as a user interface or power receiver control functionality.

The communication carrier signal may accordingly be used to provide a secondary/auxiliary low level power transfer path from the power transmitter to the power receiver. To support this, the power receiver comprises a power extractor 311 which is arranged to extract power from the communication carrier signal. In the specific example, the power extractor 311 may accordingly extract power from the NFC carrier signal.

The power extractor 311 is coupled to a load circuit 313 which may be provided by power extracted from the communication carrier signal by the power extractor 311. The load circuit 313 may typically be a control logic/support function/circuit of the power receiver, and/or may include a user interface of the power receiver. The load circuit 313 may for example include or consist in elements of the power receiver controller 301 and/or second communicator 307.

Thus, power may be provided from the power transmitter to the power receiver via communication carrier signal/NFC carrier power harvesting. This may provide power to low power level, and e.g. low voltage voltage, electronics, such as the NFC hardware or a user interface. For example, for an NFC implementation, the extracted power may be up to around 200 mW.

The auxiliary power provision may in particular be provided during the standby phase and thus then communication carrier signal may during the standby phase not only be used to provide a (typically bilateral) communication channel between the power transmitter and the power receiver also provide an auxiliary power provision to the power receiver. Thus, auxiliary power provision during the standby phase may provide supply power that may be used e.g. to supply internal circuitry, such as the communication functionality, when no power transfer signal is present. For example, during a traditional connected phase of a Ki system, power may be harvested from a continuous NFC communication carrier signal.

Figure 4:
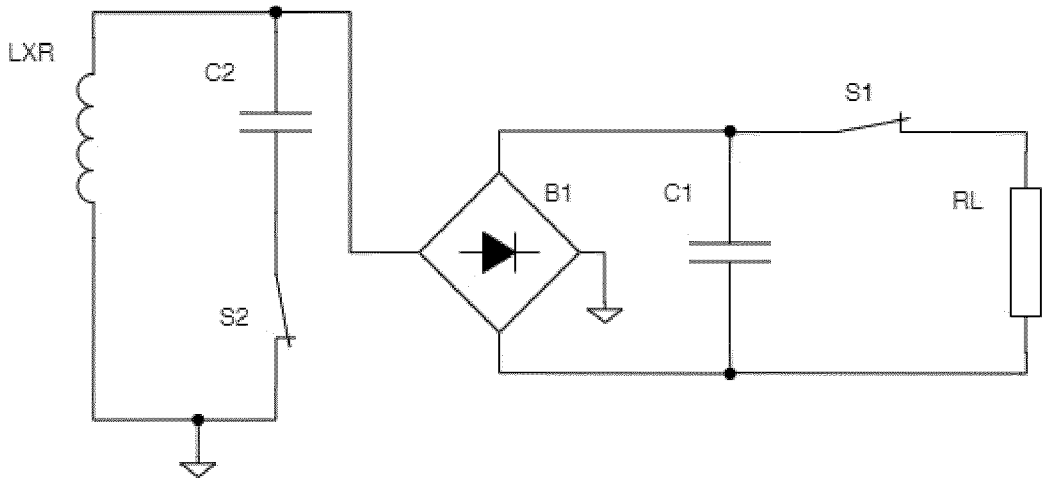
FIG. 4 illustrates an example of elements of a power transfer path for a wireless power transfer operation.

The power extractor 311 may be relatively simple and an example of power extracting circuitry/power path is illustrated in FIG. 4.

FIG. 4 illustrates a circuit diagram of elements of an example of a power path of the power extractor 311. In the example, the second communication coil 309 is referred to by the designation LRX and when this is subjected to the communication carrier signal a corresponding AC voltage/current is induced in the coil. The power extractor 311 includes a capacitor CRX in parallel to the second communicator 307/LRX thereby forming a resonance circuit allowing improved performance and power transfer in many embodiments.

The second communication coil 309/LRX is coupled to a rectifier bridge B1 with a smoothing capacitor C1 coupled to the output of the bridge. Thus, a DC voltage is generated over the capacitor C1. The magnitude of the ripple on the DC voltage will depend on the size of the smoothing capacitor as well as on the load RL supplied by the power extractor 311.

The bridge B1 and smoothing capacitor C1 are coupled to a load RL via a switch S1 which can be used to switch on and off the power extraction/harvesting. It will be appreciated that in many embodiments, the power extractor 311 may be directly and permanently coupled to the load RL with no switch being present.

FIG. 4 further illustrates a load modulation capacitor C2 which can be connected or disconnected in parallel to the second communication coil 309 based on the switching of switch S2. The second communicator 307 may during the communication time intervals control the switch S2 to provide the desired load modulation.

Thus, the power extractor 311 may be implemented by a low complexity and low cost circuit.

A particular issue for many wireless power transfers is the management and initiation of the power transfer and the switching between standby phase and the power transfer phase. In particular, reliable and user friendly operation is particularly challenging in situations where the repeated power transfer operations may be desired without there being any physical movement or change in the power receiver to power transmitter arrangement.

For example, a scenario may be considered where a cordless kettle has been placed on top of a power transmitter in order to boil water. After the water has boiled, the kettle may switch off but may be left on top of the power transmitter. The power transfer operation may be terminated, e.g. by the power receiver transmitting a power transfer termination message to the power transmitter and the power transmitter in response proceeding to enter the standby phase by switching off the power transfer signal.

Indeed, as this condition may last for a very long time, it is important to minimize energy consumption and accordingly the power receiver is traditionally entered into a fully powered down mode where no power is extracted from the power transmitter and no power or communication signal is generated by the power transmitter. Specifically, it may enter the idle phase as previously described.

Indeed, the regulations for e.g. Ki requires the power transmitter to enter a fully powered down standby mode after a certain duration thereby also requiring the auxiliary power delivery and communication to be shut down.

However, this provides a challenge if it is desired to start a new power transfer operation for the same device. For example, after some time (which could be hours or even days), it may be desired to re-boil the water in the kettle, and thus a new power transfer operation may be desired. However, as the kettle has not been physically moved or removed, the normal approach of starting a new power transfer operation when the presence of a power receiver is detected is not applicable.

One solution that has been proposed is simply to require the user to remove the power receiver, e.g. the kettle, and reposition it on the power transmitter in order to start a new power transfer operation. However, such an approach is impractical and typically not desirable to a user. Further, such an approach presumes that the power transmitter in the standby phase periodically measures, e.g., the primary coil quality factor (or another parameter as resonant frequency, impedance, etc.) in order to detect the removal and repositioning the power receiver. This method requires a sufficiently high frequency of measurements per second. If the user removed and re-introduced the appliance between two measurements, there is a chance that the measurement parameter change might not be significant, and the wake-up condition may not be met. Thus, the approach tends to be relatively complex and tends to consume more power than ideal.

Another solution would be for the power transmitter to provide a user interface that the user could activate in order to initiate a new power transfer operation. However, such an approach is not useful for power transmitter operations that may not naturally have a user interface, such as for example power transmitters mounted as an integral part of a kitchen worktop. Further, it tends to be counterintuitive to a user to have to use a user interface that is not part of the device being operated. Another disadvantage is that it may prevent optimization of the user interface as a power transmitter user interface typically will need to be sufficiently generic to be suitable for all possible power receiver devices whereas a user interface of the device itself can be optimized for the device.

The wireless power transfer system of FIG. 1 (and the power transmitter and/or power receiver of FIGS. 2 and 3) may employ an approach that may provide an improved performance, and which typically may facilitate initialization of power transfer from a standby phase, and which typically may allow such initialization without requiring movement of the power receiver or any user input to the power transmitter. It may typically further allow an ultra low power consumption standby phase.

In the approach, the power transmitter is arranged to employ a repeating time frame to the communication drive signal/communication carrier signal during the standby phase. The repeating time frame is divided into communication time intervals and non-communication time intervals where the power level of the power transfer signal is much lower during the non-communication time intervals than during the communication time intervals, and indeed typically the communication carrier signal is completely switched off during the non-communication time intervals. The non-communication time intervals may also be referred to as reduced power time intervals.

Typically, each repeating time frame comprises one communication time interval and one non-communication time interval.

The duration of the communication time intervals and the non-communication time intervals is substantially different with the communication time intervals being substantially shorter than the non-communication time intervals, and specifically the duration does not exceed 20%, and often does not exceed 10% or 5%, of the duration of the non-communication time intervals. The communication time intervals have a duration that is a relatively low fraction of the duration of the repeating time frame. In many embodiments, the duration of a communication time interval does not exceed 20%, 10% or 5% of the duration of the repeating time frame.

Each repeating time frame typically has the same duration, and typically has the same configuration of communication time intervals and non-communication time intervals.

The duration of each repeating time frame is in many embodiments in the range from 50 msec to 10 seconds, and particularly advantageously in the range from 200 msec to 300 msec. In the following, the description will focus on an example where each repeating time frame has a duration of 250 msec, and thus a frequency of 4 Hz, and with each time frame consisting in one communication time interval of 20 msec duration and one non-communication time interval of 230 msec duration.

The power level of the communication drive signal/communication carrier signal during the non-communication time intervals is substantially lower than the power level of the communication drive signal/communication carrier signal during the communication time intervals.

The amplitude/power level of the communication drive signal during the non-communication time intervals in many embodiments does not exceed 10%, 5%, 2%, or even 1% of a power level and/or amplitude of the communication drive signal and/or communication carrier signal during the communication time intervals. In cases where the amplitude/power level of the communication drive signal/communication carrier signal may vary during the repeating time frame, the average amplitude/power level of the communication drive signal during the non-communication time intervals in many embodiments does not exceed 10%, 5%, 2%, or even 1% of an average power level and/or amplitude of the communication drive signal and/or communication carrier signal during the communication time intervals.

In many embodiments, the amplitude/power level of the communication drive signal/communication carrier signal is fixed within each communication time intervals and/or within each non-communication time intervals. In some embodiments, the amplitude/power level of the communication drive signal/communication carrier signal may be set to a predetermined level within each communication time intervals and/or within each non-communication time intervals.

The communication driver 209 is thus in the described approach arranged to during the standby phase generate a communication drive signal/communication carrier signal which employs a repeating time frame with communication time intervals and non-communication time intervals. The communication time intervals are short compared to the non-communication time intervals but are generated with a substantially higher power/amplitude level. Indeed, in most embodiments, the communication carrier signal is generated to only be present during the communication time intervals, i.e. during the non-communication time intervals the communication drive signal/communication carrier signal may be switched off completely. The amplitude power level of the communication drive signal/communication carrier signal may be zero during the non-communication time intervals.

Figure 5:
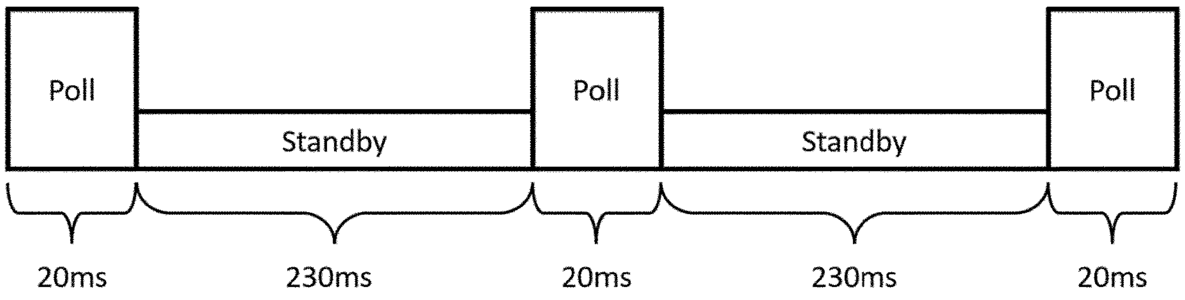
FIG. 5 illustrates an example of a repeating time frame for a communication carrier signal in a wireless power transfer system in accordance with some embodiments of the invention.

During the standby phase, the power transmitter is accordingly arranged to generate short "bursts" of the communication carrier signal but with the level of the communication carrier signal being very low at other times, and typically being fully switched off. FIG. 5 illustrates an example of the communication carrier signal that may be generated during the standby phase.

In the approach, the power receiver is arranged to provide a particular communication to the power transmitter using the bursts of the communication carrier signal, and thus may provide a specific communication during the communication time intervals.

Specifically, in the scenario where the power receiver remains in position following the termination of the power transfer operation, the power receiver may enter a standby phase in which it proceeds to transmit identity messages to the power transmitter in the communication time intervals. The power receiver transmits the identity messages by load modulating the communication carrier signal which is generated by the power transmitter during the communication time intervals of the standby phase.

The power receiver is arranged to not transmit any identity messages, or indeed any messages, during the non-communication time intervals of the repeating time frames. In many embodiments, the power receiver is arranged to transmit no other messages than the identity messages during the repeating time frame, and specifically during the communication time intervals only identity messages may be transmitted.

Each of the identity messages comprises a device identity for the power receiver. The identity messages accordingly comprise an identification of the power receiver. The device identity may be a permanent or temporary identity for the power receiver. In some cases, the device identity may be dynamically allocated to the power receiver and in other embodiments or scenarios, the device identity may be a permanently allocated to the power receiver.

The device identity may be an data word with different power receivers (or power receiver groups) being assigned different device identities/data words. The device identity may provide differentiation between different power receivers and may specifically allow a power transmitter to tell power receivers apart, and different power receivers may have different device identities.

The device identity accordingly allows the power receiver to identify itself to the power transmitter. The power receiver is arranged to repeatedly transmit the identity messages with the device identity to the power transmitter thereby identifying itself to the power transmitter. Accordingly, the power transmitter is continuously informed not only that a power receiver is present but also that this power receiver is indeed the same one as previously. In the scenario where the described standby phase has been entered from a previous power transfer phase providing power to the power receiver, the continued transmission of identity messages during the standby phases informs the power transmitter that the same power receiver is still present, and thus informs the power transmitter of the scenario where no physical change has occurred. This may for example enable the power transmitter to determine that a new power transfer may be initiated without any new presence detection etc., Thus, it allows the power transmitter to differentiate between the scenario where the same power receiver is simply left in the same position and the scenario in which the power receiving device is replaced by another power receiver.

Further, in the arrangement, the power receiver is arranged to detect a power request and in response it is arranged to change the device identity of one or more of the identity messages. Thus, in response to the detection of a request for power (from an internal or external source), the second communicator 307 may change the device identity from the device identity of an identity message relative to the device identity that were used in the previous identity message(s).

The request for power may for example be determined automatically by the power receiver, e.g. due to a time expiring, a load level, or other electrical parameter of the load changing etc. In many embodiments, the power request may however as will be described in more detail later be in response to a user activation/input.

In response to the first communicator 205 receiving a different device identity in an identity message, it may proceed to inform the power transmitter controller 203. The power transmitter controller 203 may then proceed to initialize a transition from the standby phase to the power transfer phase in response to a detection of a first identity message comprising a changed device identity.

Further, the power receiver is arranged to transition to the power transfer phase. Typically, the power receiver may monitor for the presence of a power transfer signal and a signal being induced in the receiver coil 107. It may then proceed to interwork with the power transmitter to start a new power transfer operation.

Thus, in the approach, the power transmitter and power receiver operate in a standby phase in which no power transfer signal is generated, and in which a bursty communication carrier signal is provided to allow communication of identity messages from the power receiver to the power transmitter. The identity messages inform the power transmitter that the same power receiver remains in position, and further provides a specific means for the power receiver to initiate the power transmitter to transition to the power transfer phase. The approach provides a very low power standby phase yet provides an efficient means for allowing the same power receiver to remain at the same position yet be able to initiate a new power transfer operation without e.g. requiring any user interface at the power transmitter or requiring any movement of the power receiver.

The power transmitter controller 203 may be arranged to control the power transmitter to perform a power transfer initialization which be for example follow the same approach as when initializing a power transfer when a power receiver is first position at the power transmitter. Similarly, the power receiver may be arranged to perform the same power transfer initialization as when it is first positioned close to the power transmitter.

For example, the power transmitter and power receiver may be arranged to perform power transfer initialization in accordance with the Ki specifications. For example, the power transmitter and power receiver may proceed to go through the configuration phase and possibly the connected phase to reach the power transfer phase.

However, in some embodiments, the power transmitter may be arranged to modify the operation and specifically the initialization of the power transfer phase compared to the situation where power transfer phase is initiated with a new power receiver.

In particular, in the example where the power transfer phase transition is performed in response to the detection of the change in the received device identity, the initialization may take into account a previously determined parameter for the power receiver, and specifically the power transfer phase may be initiated with at least one operating parameter being dependent on a stored property of the power receiver. For example, in some embodiments, part of the configuration phase, in some cases the entire configuration phase, may be skipped with the parameters of a previous power transfer operation being reused for the current power transfer operation.

Thus, in some embodiments, the power transmitter controller 203 may when performing a power operation store configuration parameters for the power receiver. These parameters may specifically include configuration parameters that may be selected/determined/negotiated during a configuration or negotiation phase when starting up the power transfer. For example, for Ki systems, a configuration phase is undertaken in which the power transmitter and power receiver interwork to determine suitable parameters for the power transfer. These parameters may by the power transmitter controller 203 be stored to be used in future power transfer operations.

Parameters that may be determined and stored may for example include a power level setting or level, a parasitic power loss parameter (e.g. used to adapt a foreign object detection), an operating mode indication, a load configuration indication, a particular user interface setting, a time-property relevant for the power transfer, etc., In some embodiments, various parameters may be determined during the power transfer phase and stored by the power transmitter controller 203. For example, the power consumption of the power receiver may be monitored and when power transfer is terminated, e.g. the minimum, maximum, and average power consumption may be stored.

The configuration parameters may be stored at any suitable time, including before, during, or after a (previous) power operation.

In such cases, the power transmitter controller 203 may when initiating a new power transfer operation in response to a detection of a changed device identity for the same power receiver proceed to retrieve the stored configuration parameters and apply these. Indeed, in some embodiments, the power transmitter may proceed to the power transfer phase without any communication or interaction with the power receiver about suitable operating parameters. Rather, it may e.g. simply restart the power transfer phase using the same operating parameters as when the previous power transfer terminated, or e.g. may use the same initial operating parameters as for the previous power transfer operation.

In many embodiments, the power transmitter controller 203 may be arranged to modify the power transfer initialization when this is in response to a detection of a changed device identity (from the same power receiver) relative to the power transfer initialization when this is in response to a detection of a new power receiver being present.

In particular, it may be arranged to adapt the power transfer initialization process in response to the detection of the changed identity. In many embodiments, it may for example be arranged to skip or bypass an initialization operation that is performed for a new or unknown power receiver. For example, a presence detection, authentication, or configuration operation included for a new power receiver may not be performed for a power transfer phase initialization performed in response to a detection of a changed device identity.

The specific details and properties of the identity messages and device identities used may depend on the requirements and preferences of the individual embodiment. The device identity is specific to the individual power receiver and different power receivers will (at least with high probability) have different identities. Accordingly, if the power receiver were to be replaced with another power receiver, and with this swap being sufficiently fast for the absence of a power receiver not to be detected, any identity messages that may be transmitted from the new power receiver is likely to not share the device identity with the current power receiver and thus the presence of a new, rather than the old, power receiver would be detected. Similarly, if the power receiver is removed and another power receiver happens to be close to the power transmitter, any identity messages from this power receiver will not include the device identity of the power receiver of the previous power transfer.

The transmissions of the identity messages with device identities provides for highly reliable operation when the power receiver remains after termination of a power transmission. The power transmitter can differentiate between the continued presence and the presence of a new power transmitter.

In some embodiments, each power receiver may be allocated a unique and fixed device identity e.g. during manufacturing and this identity may be used as the device identity. Indeed, in some embodiments, each power receiver may be allocated two unique and fixed device identities e.g. during manufacturing. These identities may be used as the device identities for maintaining the standby phase and for requesting initiation of a power transfer phase. In such cases, permanent and unique device identities may accordingly be used as the standby phase device identities.

In some embodiments, the device identity may for example be temporary and/or dynamically allocated or determined. For example, in some embodiments, each power transmitter may be allocated a range of device identities that it can allocate to power receivers. When a new power receiver is detected and power transfer initiated, the power transmitter may e.g. as part of the configuration phase, transmit one or two device identities to the power receiver which may then proceed to use these in a subsequent power transfer phase. If the power transmitter and the power receive detects that the power receiver has been removed from the power transmitter, they may both be arranged to delete the associations between the device identities and the power receiver. The device identity may then be reused with another power receiver. Improved reliability may for example be achieved by the power transmitter using a multiple device identity (pairs) to ensure that there is some time between the reuse of the same device identity(ies).

Indeed, in some embodiments, the power receiver may itself determine a device identity and provide this to the power transmitter. For example, a random device identity may be generated by the power receiver and transmitted to the power transmitter. The power receiver may then during a subsequent standby phase transmit this device identity to the power transmitter. Accordingly, the power transmitter can determine that the same power receiver remains in position. As long as the device identity is sufficiently long, the likelihood that a new power receiver would generate the same device identity as an existing power receiver is highly unlikely.

As mentioned, the communication may in many embodiments be NFC communication and the communication carrier signal may be an NFC carrier. In such embodiments, the identity messages may be an NDEF message, and specifically an NDEF (NFC Data Exchange Format) static configuration message.

The identity messages may in such cases specifically include a NDEF record and the device identity may be a NFC UID (User IDentity). A UID is number that is unique to the NFC device and which cannot be deleted or changed.

Thus, specifically, the power transmitter may during the standby phase poll the power receiver by activating the communication carrier signal/NFC carrier thereby enabling some power receiver operation. Device identification may be performed e.g. by reading a stored device identity, such as a device UID or proprietary identification).

The power transmitter controller 203 is arranged to determine that a changed device identity has been received and to proceed to initialize a power transfer operation in response to this detection.

In some embodiments, the power transmitter controller 203 may be arranged to store two device identities for the power receiver that is present when starting the standby phase with one of these corresponding to no request for power transfer, henceforth referred to as a continuation device identity, and one corresponding to a request for power transfer being made, henceforth referred to as a power request device identity. The power transmitter controller 203 may then compare the received device identity of the identity messages received during the standby phase to the stored device identity and proceed dependent on the results.

For example, in the situation where the power receiver is allocated two device identities and where these are known to the power transmitter, the power transmitter controller 203 may simply extract the device identity from each identity message and compare it to locally stored device identities. If the extracted device identity corresponds to the stored continuation device identity, the power transmitter may continue with an operation suitable for the situation where the power receiver remains in place and where no power transfer is requested. The power transmitter may for example proceed to switch off the communication drive signal/communication carrier signal and terminate the communication time interval. It may set a time for the next communication time interval indicating the next time a communication carrier signal is to be generated. If, however, the received device identity matches the stored power request device identity, the power transmitter controller 203 proceeds to initialize a new power transfer operation. If the received device identity does not match any of the stored two device identities, the power transmitter may proceed to modify the standby phase (and potential subsequent power transfer operations) to reflect that a new power receiver is present. In some cases, the detection of a device identity that does not match any of the device identities associated with the power receiver of the previous power transfer phase may result in an initiation of a new power transfer operation but with this initialization being adapted to reflect that it is for a new power receiver (e.g. a full configuration is performed).

In some embodiments, the power receiver may be allocated two device identities that may be known to the power transmitter, e.g. by being communicated during a power transfer phase. These may then be stored as respectively the continuation device identity and the power request device identity.

In other cases, the power request device identity may for example be a predetermined device identity. For example, the power transmitter controller 203 may store a predetermined device identity which corresponds to a power request, i.e. the power request device identity may be a predetermined identity. The predetermined device identity may be common to different power receivers whereas the continuation device identity may be specific to the individual power receiver.

Thus, in some embodiments, the power transmitter controller 203 may compare the received device identity to the stored device identity for the power receiver and if this is a match, it may proceed with no changes. However, if the received device identity corresponds to a predetermined power request device identity, which may be common for different power receivers, the power transmitter controller 203 may proceed to initiate a power transfer operation. Again, if the received device identity does not match any of these, the power transmitter may proceed as appropriate for a new power receiver being present. An advantage of such an approach is that each power receiver may be assigned only one specific device identity.

The power transmitter controller 203 may be arranged to compare the received device identity to a device identity of a previously received identity message. For example, when first entering the standby phase, the device identity of the first received identity message may be stored as the continuation device identity. For subsequent identity messages, the device identity is then compared to the continuation device identity, and thus to the first received device identity of the standby phase. Such an approach may be efficient in not requiring any prior communication or determination of device identity associated with the specific power receiver.

In some embodiments, the continuation device identity and/or the power request device identity may be provided prior to entering the standby phase. For example, during the configuration phase of a previous power transfer initialization, and specifically the first one performed for the given power receiver, the power receiver may report a device identity that may be used as the continuation device identity in a subsequent standby phase. The power transmitter may then store this device identity as the continuation device identity for later use. Similarly, in some embodiments, a power request device identity may be provided and stored for use in a potential subsequent standby phase.

The power receiver may specifically be arranged to change the device identity in response to a detection of a user input.

In many embodiments, the power receiver may comprise a user interface 315. Such a user interface may comprise user output means such as indicator lights, audio indicators, displays etc. The user interface 315 may alternatively or additionally include a user input means such as a keyboard, voice recognition, user buttons etc. In some embodiments, the user interface may simply consist in a single push button.

The user interface 315 is coupled to the identity controller 315 which is arranged to detect a power that a power request has been made by a user. The identity controller 315 may detect the request in response to a detection of a user activation of the user interface. For example, in the simple example of the user interface 317 simply being a push button, the identity controller 315 may detect if the user pushes the button and consider this activation as a power request. In other embodiments, the user requesting power may for example be by a keyboard entry or a spoken statement which may be received via the user interface.

In response to the detection of the power request and the user activation, the identity controller 315 may proceed to change the device identity in the identity messages to communicate to the power transmitter that a power transfer is requested. Specifically, the identity controller 315 may in response to the detection of the user activation, proceed to generate identity messages in which the device identity indicative of a power request is transmitted.

The approach may thus allow a highly reliable and safe standby phase from which a power transfer can easily and efficiently be re-initialized in response to a user providing a user input to the power receiver itself (e.g. simply pressing a button on the power receiver).

The user interface may specifically be a passive user interface, and thus specifically may be a user interface that does not consume any power. Such a user interface may for example be implemented using mechanical switches or push buttons. A passive user interface may be implemented to minimize power consumption. It may be in particular be arranged to ensure that no power needs to be extracted from the power receiver during the standby phase. It may in particular provide a continuous user interface where the user interface can always be interacted with by a user without any consideration or dependency on when the communication carrier signal is present and power can be provided. Thus, the operation of the user interface by the user may be at any time and is not affected by the burstiness of the communication carrier signal.

In many embodiments such a passive user interface may be arranged to maintain the user activation indication for a duration which exceeds the duration of the non-communication time interval, and which typically is longer than the duration between two communication time intervals. In many embodiments, the user activation indication is maintained for a duration that exceeds the duration of a repeating time frame.

In some embodiments, this may be achieved by the user input including e.g. a mechanical latching function. For example, a latching push button may be used. In some cases, a mechanical activator with an instant on and delayed off function (or vice versa) may for example be used. In some cases, the user interface may for example simply utilize a switch with different positions.

In such embodiments, the user interface may be activated at any time while at the same time allowing the circuitry detecting the user activation and adapting the operation in response may be arranged to only operate during communication time intervals where a communication carrier signal is present and power can be extracted. For example, whenever a communication time interval is entered and the communication carrier signal is present, power may be extracted by the power extractor 311 and supplied to the second communicator 307 and the identity controller 315. The identity controller 315 may poll the user interface and select the appropriate device identity. For example, if no user activation is detected corresponding to a power request, the identity controller 315 proceeds to select the same device identity as in the previous message and otherwise it selects a different device identity (as described previously) to indicate a request for a new power transfer to be initialized.

In many embodiments, the power receiver may not have any other power source than the power delivery channels supplied by the power transmitter, and may have no means for energy storage during the non-communication time intervals of the standby phase. Therefore, the power receiver may be considered entirely out of power during at least part of the standby phase. The user interface may in such embodiments be passive and able to maintain a switching state (latched buttons and knobs, rotary switches) or ultra-low power electronics circuits (e.g., bi-stable multivibrator).

In some embodiments, the identity controller 315 may be arranged to detect the user activation in response to a detection that a setting of the user interface has changed, and specifically that it has changed relative to a setting of the previous power transfer phase.

In some embodiments, the identity controller 315 may during the power transfer phase be arranged to store one or more settings of the user interface. For example, the setting of switches may be stored. This may for example be done continuously throughout the power transfer phase or may e.g. be done as part of the termination of the power transfer phase.

During the standby phase, the identity controller 315 may be arranged to compare the current setting(s) of the user interface to the stored settings. If there is a difference, the identity controller 315 may in response determine that a user activation has been performed. In some embodiments, any change may be considered to be a request for a power transfer and the identity controller 315 may proceed to change the device identity of the image data source 203 to indicate the power request to the power transmitter. In other embodiments, the identity controller 315 may determine whether a specific user interface setting has changed and change the device identity in response to this specific change.

In some embodiments, it may be advantageous if the power receiver compares the current user interface state/settings (e.g., rotary switch position) to those present before entering the standby phase. The power transmitter may in some embodiments transmit a message to the power receiver indicating that it is about to enter the standby phase and the power receiver may in response proceed to save the current user interface setting in non-volatile memory. This may facilitate operation and reduce the number of write cycles of non-volatile memory. The stored user interface state is then compared to the actual user interface state during poll intervals that typically correspond to the communication time intervals. If a change in user interface state is detected, the device identity of the identity messages is changed to request initiation of a new power transfer.

The message from the power transmitter may also be used by the power receiver to initialize the standby phase operation of transmitting identity messages with a device identity during the communication time intervals.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

Generally, examples of a power transmitter and method of operation therefor, power receiver and method of operation therefor, and a wireless power transfer system (and method of operation therefor) are indicated by below embodiments.

EMBODIMENTS

Embodiment 1. A power transmitter (101) for wirelessly providing power to a power receiver (105) via an inductive power transfer signal, the power transmitter (101) comprising:

- a power transfer coil (103) arranged to generate the power transfer signal;
- a power transfer driver (201) arranged to generate a power transfer drive signal for the power transfer coil (103), the power transfer driver (201) being arranged to generate the power transfer drive signal during a power transfer phase;
- a communication coil (207) arranged to generate a communication carrier signal;
- a communication driver (209) arranged to generate a communication drive signal for the communication coil to generate the communication carrier signal, the communication driver (209) being arranged to generate the communication drive signal to employ repeating time frames during a standby phase in which no power transfer signal is present, each repeating time frame comprising a communication time interval and a non-communication time interval, a duration of the communication time interval not exceeding 20% of a duration of the non-communication time interval and a power level of the communication drive signal during the non-communication time intervals not exceeding 10% of a power level of the communication drive signal during the communication time intervals;
- a communication unit (205) arranged to receive identity messages load modulated onto the communication carrier signal during communication time intervals during the standby phase, each identity message of the identity messages comprising a device identity for the power receiver;

a phase controller (203) arranged to switch the power transmitter from the power transfer phase to the standby phase in response to a power transfer termination and to initialize a transition from the standby phase to the power transfer phase in response to a detection of a first identity message comprising a changed device identity.

Embodiment 2. The power transmitter of embodiment 1 wherein the phase controller (203) is arranged to detect the changed device identity in response to a comparison of a device identity of the first identity message to a device identity of a second identity message received prior to the first identity message.

Embodiment 3. The power transmitter of embodiment 1 or 2 wherein the phase controller (203) is arranged to detect the changed device identity in response to a comparison of a device identity of the first identity message to a predetermined device identity.

Embodiment 4. The power transmitter of any previous embodiment wherein the phase controller (203) is arranged to detect the changed device identity in response to a comparison of a device identity of the first identity message to a device identity of an identity message received from the power receiver (105) prior to entering the standby phase.

Embodiment 5. The power transmitter of any previous embodiment wherein the phase controller (203) is arranged to store a configuration parameter for the power receiver (105) upon entering the standby phase; to retrieve the configuration parameter as part of the transition from the standby phase to the power transfer phase, and to determine an operating parameter for the power transfer phase in dependence on the configuration parameter.

Embodiment 6. The power transmitter of any previous embodiment wherein the communication carrier signal is a Near Field Communication, NFC, carrier.

Embodiment 7. The power transmitter of any previous embodiment wherein the identity messages are Near Field Communication, NFC, NFC Data Exchange Format, NDEF, configuration messages.

Embodiment 8. The power transmitter of any previous embodiment wherein the repeating time frames have duration of no less than 50 msec and no more than 10 seconds.

Embodiment 9. The power transmitter of any previous embodiment wherein the power transmitter controller 203 is arranged to adapt an operation of a power transfer phase initialization process in response to the detection of the changed identity.

Embodiment 10. A power receiver (105) for wirelessly receiving power from a power transmitter (101) via an electromagnetic power transfer signal, the power receiver (105) comprising:

an inductive power extraction element (107) arranged to extract power from the power transfer signal during a power transfer phase;

a communication coil (309) for receiving a communication carrier signal; the communication drive signal employing repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals;

a communication unit (307) arranged to transmit identity messages by load modulation of the communication carrier signal during communication time intervals during the standby phase, each identity message of the identity messages comprising a device identity for the power receiver (105);

a power extractor (311) coupled to the communication coil (309) and arranged to extract a power supply signal from the communication coil (309) and to supply a circuit (313) of the communication unit by the power supply signal during the communication time intervals; and a controller (315) arranged to change a device identity for a first identity message relative to a device identity of a previous identity message in response to a detection of a power request, the power request being an indication of a request for initiation of a power transfer phase.

Embodiment 11. The power receiver (105) of embodiment 10 further comprising a user interface (317), and the controller (315) is arranged to detect the power request in response to a detection of a user activation of the user interface (317).

Embodiment 12. The power receiver (105) of embodiment 11 wherein the user interface is a passive user interface arranged to maintain a user activation indication of the user activation for a duration in excess of a duration of the non-communication time interval.

Embodiment 13. The power receiver (105) of any of the previous embodiments 10-12 wherein the controller is arranged to store a first user interface setting of a power transfer phase prior to entering a standby phase, to determine a second user interface setting during the standby phase, and to detect the user activation in response to a detection of a difference between the first user interface setting and the second user interface setting.

Embodiment 14. The power receiver (105) of any of the previous embodiments 10-13 wherein the controller is arranged to be powered by the supply signal only during the communication time intervals.

Embodiment 15. A wireless power transfer system comprising a power transmitter (101) in accordance with any of embodiments 1 to 9 and a power receiver (105) in accordance with embodiment 10 to 14.

Embodiment 16. A method of operation for a power transmitter (101) wirelessly providing power to a power receiver (105) via an inductive power transfer signal, the power transmitter (101) comprising:

a power transfer coil (103) arranged to generate the power transfer signal; and a communication coil (207) arranged to generate a communication carrier signal; and the method further comprising:

generating a power transfer drive signal for the power transfer coil (103) during a power transfer phase;

generating a communication drive signal for the communication coil to generate the communication carrier signal, the communication drive signal being generated to employ repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals;

receiving identity messages load modulated onto the communication carrier signal during communication time intervals during the standby phase, each identity message of the identity messages comprising a device identity for the power receiver;

switching the power transmitter from the power transfer phase to the standby phase in response to a power transfer termination; and initializing a transition from the standby phase to the power transfer phase in response to a detection of a first identity message comprising a changed device identity.

Embodiment 17. A method of operation for a power receiver (105) wirelessly receiving power from a power transmitter (101) via an electromagnetic power transfer signal, the power receiver (105) comprising:

an inductive power extraction element (107) arranged to extract power from the power transfer signal during a power transfer phase; and the method comprising:

a communication coil (309) receiving a communication carrier signal; the communication drive signal employing repeating time frames during a standby phase in which no power transfer signal is present, each repeating time frame comprising a communication time interval and a non-communication time interval, a duration of the communication time interval not exceeding 20% of a duration of the non-communication time interval, and a power level of the communication drive signal during the non-communication time intervals not exceeding 10% of a power level of the communication drive signal during the communication time intervals;

transmitting identity messages by load modulation of the communication carrier signal during communication time intervals during the standby phase, each identity message of the identity messages comprising a device identity for the power receiver (105);

extracting a power supply signal from the communication coil (309);

supplying a circuit (313) of the communication unit by the power supply signal during the communication time intervals; and changing a device identity for a first identity message relative to a device identity of a previous identity message in response to a detection of a power request, the power request being an indication of a request for initiation of a power transfer phase.

More specifically, the invention is defined by the appended CLAIMS.

The invention claimed is:

1. A device comprising:

a power transfer coil, wherein the power transfer coil is arranged to generate a power transfer signal;

a power transfer driver, wherein the power transfer driver is arranged to generate a power transfer drive signal for the power transfer coil, wherein the power transfer driver is arranged to generate the power transfer drive signal during a power transfer phase;

a communication coil, wherein the communication coil is arranged to generate a communication carrier signal;

a communication driver, wherein the communication driver is arranged to generate a communication drive signal for the communication coil so as to generate the communication carrier signal, wherein the communication drive signal uses a plurality of repeating time frames during a standby phase, wherein no power transfer signal is present during the standby phase, wherein each of the plurality of repeating time frames comprise a communication time interval and a non-communication time interval, wherein a duration of the communication time interval does not exceed 20% of a duration of the non-communication time interval, wherein a power level of the communication drive signal during the non-communication time interval does not exceed 10% of a power level of the communication drive signal during the communication time interval;

a communication circuit, wherein the communication circuit is arranged to receive a plurality of identity messages load modulated onto the communication carrier signal during the communication time interval, wherein each identity message of the plurality of identity messages comprises a device identity for a power receiver, wherein the plurality of identity messages comprises a first identity message and second identity message, wherein the first identity message comprises a first device identity, wherein the second identity message comprises a second device identity;

a phase controller circuit, wherein the phase controller circuit is arranged to switch the power transmitter from the power transfer phase to the standby phase in response to a power transfer termination, wherein the phase controller circuit is arranged to compare a first device identity to a second device identity, wherein the phase controller circuit is arranged to remain in the standby phase if the first device identity matches the second device identity, wherein the phase controller circuit is arranged to initialize a transition from the standby phase to the power transfer phase if the first device identity does not match the second device identity.

2. The device of claim 1, wherein the second identity message is received in the same standby phase as the first identity message.

3. The device of claim 1, wherein the second device identity is a device identity when the power receiver receives power in a power transfer phase immediately preceding the standby phase.

4. The device of claim 1, wherein the second identity message is received from the power receiver prior to entering the standby phase.

5. The device of claim 1, wherein the phase controller circuit is arranged to store a configuration parameter for the power receiver upon entering the standby phase, wherein the phase controller circuit is arranged to retrieve the configuration parameter as part of the transition from the standby phase to the power transfer phase, wherein the phase controller circuit is arranged to determine an operating parameter for the power transfer phase based on the configuration parameter.

6. The device of claim 1, wherein the communication carrier signal is a Near Field Communication carrier.

7. The device of claim 1, wherein the plurality of identity messages are Near Field Communication Data Exchange Format configuration messages.

8. The device of claim 1, wherein the plurality of repeating time frames have duration of no less than 50 msec and no more than 10 seconds.

9. The device of claim 1, wherein the phase controller circuit is arranged to change an operation of a power transfer phase initialization process in response to a changed identity.

10. A device comprising:

a power extraction circuit, wherein the power extraction circuit is arranged to extract power from a power transfer signal during a power transfer phase;

a communication coil, wherein the communication coil is arranged to receive a communication carrier signal, wherein the communication drive signal uses the plurality of repeating time frames during a standby phase, wherein power transfer signal is present during the standby phase, wherein each of the plurality of repeating time frames comprise a communication time interval and a non-communication time interval, wherein a duration of the communication time interval does not exceed 20% of a duration of the non-communication time interval, wherein a power level of the communication drive signal during the non-communication time interval does not exceed 10% of a power level of the communication drive signal during the communication time interval;

a communication circuit, wherein the communication circuit is arranged to transmit a plurality of identity messages by load modulation of the communication carrier signal during the communication time interval, wherein each identity message of the plurality of identity messages comprises a device identity for the power receiver, wherein the plurality of identity messages comprises a first identity message;

a power extractor circuit, wherein the power extractor circuit is coupled to the communication coil, wherein the power extractor circuit is arranged to extract a power supply signal from the communication coil, wherein the power extractor circuit is arranged to supply a portion the communication circuit by during the communication time interval; and a controller circuit, wherein the controller circuit is arranged to change a device identity to a first identity message in response to a detection of a power request, wherein the power request is an indication of a request for initiation of a power transfer phase.

11. The power receiver of claim 10, further comprising a user interface circuit, wherein the controller circuit is arranged to detect the power request in response to a detection of a user activation of the user interface circuit.

12. The power receiver of claim 11, wherein the user interface circuit is a passive user interface circuit, wherein the user interface circuit is arranged to maintain a user activation indication of the user activation for a duration in excess of a duration of the non-communication time interval.

13. The power receiver of claim 10, wherein the controller circuit is arranged to store a first user interface setting of a power transfer phase prior to entering a standby phase, wherein the controller circuit is arranged to determine a second user interface setting during the standby phase, wherein the controller circuit is arranged to detect the user activation in response to a detection of a difference between the first user interface setting and the second user interface setting.

14. The power receiver of claim 10, wherein the controller circuit is arranged to be powered by the supply signal only during the communication time interval.

15. A method comprising:

generating a power transfer signal during a power transfer phase;

generating a communication carrier signal;

wherein the communication carrier signal uses a plurality of repeating time frames during a standby phase, wherein no power transfer signal is present during the standby phase, wherein each of the plurality of repeating time frame comprise a communication time interval and a non-communication time interval, wherein a duration of the communication time interval does not exceed 20% of a duration of the non-communication time interval, wherein a power level of the communication drive signal during the non-communication time interval does not exceed 10% of a power level of the communication drive signal during the communication time interval;

receiving a plurality of identity messages load modulated onto the communication carrier signal during the communication time interval, wherein each identity message of the plurality of identity messages comprises a device identity for a power receiver, wherein the plurality of identity messages comprises a first identity message and second identity message, wherein the first identity message comprises a first device identity, wherein the second identity message comprises a second device identity;

switching the power transmitter from the power transfer phase to the standby phase in response to a power transfer termination;

comparing a first device identity remaining in the standby phase if the first device identity matches the second device identity; and initializing a transition from the standby phase to the power transfer phase if the first device identity does not match the second device identity.

16. A method comprising:

extracting power from a power transfer signal during a power transfer phase;

receiving a communication carrier signal, wherein the communication drive signal uses the plurality of repeating time frames during a standby phase, wherein power transfer signal is present during the standby phase, wherein each of the plurality of repeating time frames comprise a communication time interval and a non-communication time interval, wherein a duration of the communication time interval does not exceed 20% of a duration of the non-communication time interval, wherein a power level of the communication drive signal during the non-communication time interval does not exceed 10% of a power level of the communication drive signal during the communication time interval;

transmitting a plurality of identity messages by load modulation of the communication carrier signal during the communication time interval, wherein each identity message of the plurality of identity messages comprises a device identity for a power receiver, wherein the plurality of identity messages comprises a first identity message;

extracting a power supply signal from the communication coil;

supplying a power supply signal during the communication time interval; and changing a device identity to a first identity message in response to a detection of a power request, wherein the power request is an indication of a request for initiation of a power transfer phase.

17. A non-transitory computer-readable medium storing a computer program, wherein the computer program when executed on a processor performs the method as claimed in claim 15.

18. The method of claim 15, wherein the second identity message is received in the same standby phase as the first identity message.

19. The method of claim 15, wherein the second device identity is a device identity when the power receiver receives power in a power transfer phase immediately preceding the standby phase.

20. The method of claim 15, wherein the second identity message is received from the power receiver prior to entering the standby phase.

21. The method of claim 15, further comprising:

storing a configuration parameter for the power receiver upon entering the standby phase;

retrieving the configuration parameter as part of the transition from the standby phase to the power transfer phase; and determining an operating parameter for the power transfer phase based on the configuration parameter.

22. The method of claim 15, wherein the plurality of repeating time frames have duration of no less than 50 msec and no more than 10 seconds.

23. The method of claim 15, further comprising changing an operation of a power transfer phase initialization process in response to a changed identity.

24. A non-transitory computer-readable medium storing a computer program, wherein the computer program when executed on a processor performs the method as claimed in claim 17.

25. The method of claim 16, further comprising detecting the power request in response to a detection of a user activation.

26. The method of claim 25, further comprising maintaining a user activation indication of a user activation for a duration in excess of a duration of the non-communication time interval.

27. The method of claim 16, further comprising:

storing a first user interface setting of a power transfer phase prior to entering a standby phase;

determining a second user interface setting during the standby phase; and detecting the user activation in response to a detection of a difference between the first user interface setting and the second user interface setting.

28. The method of claim 16, further comprising powering a portion of a device by the supply signal only during the communication time interval.

* * * * *